United States Patent [19]

Cipriano et al.

[11] Patent Number: 4,652,350
[45] Date of Patent: Mar. 24, 1987

[54] ELECTROCHEMICAL PROCESS

[75] Inventors: Robert A. Cipriano; Bobby R. Ezzell, both of Lake Jackson, Tex.

[73] Assignee: The Dow Chemical Company, Midland, Mich.

[21] Appl. No.: 814,433

[22] Filed: Dec. 30, 1985

Related U.S. Application Data

[63] Continuation of Ser. No. 679,504, Dec. 7, 1984, abandoned.

[51] Int. Cl.$^4$ ............................................... C25B 3/00
[52] U.S. Cl. ................................... 204/72; 204/180.1; 204/182.6
[58] Field of Search ...................... 204/72, 129, 180 P, 204/182.6

[56] References Cited

U.S. PATENT DOCUMENTS

| | | | |
|---|---|---|---|
| 2,921,005 | 1/1960 | Bodamer | 204/72 |
| 4,061,550 | 12/1977 | Cook et al. | 204/98 |
| 4,192,725 | 3/1980 | Dotson et al. | 204/98 |
| 4,357,218 | 11/1982 | Seko | 204/98 |

FOREIGN PATENT DOCUMENTS 8100687A  12/1981  Japan .................................... 204/72

OTHER PUBLICATIONS

"XR Perfluorosulfonic Acid Membranes", New Product Infor. from R & D Div., Plastics Dept., E. I. DuPont, 10-1-69, pp. 1-4.

*Primary Examiner*—R. L. Andrews

[57] ABSTRACT

A process for converting amino carboxylic acid salts to their free acids employing a three compartment cell having sulfonic acid or carboxylic acid functional styrene divinylbenzene or fluorocarbon membranes forming the intermediate compartment between the anode and cathode compartments.

10 Claims, 3 Drawing Figures

ELECTROCHEMICAL PROCESS

This is a continuation of application Ser. No. 679,504, filed Dec. 7, 1984, now abandoned.

BACKGROUND OF THE INVENTION

Conversion of salts of water soluble organic acids to pure acids has long been a problem. Simple neutralization with mineral acids or the like results in an aqueous mixture of the salt of the mineral acid and the desired organic acid. Isolation of the acids from this mixture generally results in contamination of the mineral acid salts with organics and thus to environmental disposal problems. In addition, the organic acids isolated in many cases are contaminated with salts of the mineral acid.

In order to overcome the aforementioned problems, Bodamer (U.S. Pat. No. 2,921,005) described a three-compartment electrochemical cell for neutralization of water soluble salts of weak acids to the corresponding acids. The cell used had an anode compartment, a cathode compartment, an intermediate compartment formed by two cation exchange membranes. The membranes were both sulfonated copolymers of styrene and divinylbenzene. The process was carried out by electrolyzing water on the anode to form oxygen and hydrogen ions in a dilute sulfuric acid electrolyte. Water was electrolyzed on the cathode forming hydrogen and hydroxide ions. The center compartment contained the sodium salt of a weak acid such as acetic acid. The complete process involved transferring protons from the anolyte compartment through the first cation exchange membrane into the center compartment while transferring sodium ions from the center compartment through the second cation exchange membrane to the catholyte compartment where combination with the hydroxide formed by the cathode reaction formed sodium hydroxide. It is noted in the example of the patent that the minimum voltage at 0.42 amp per square inch (asi) was 11-12 volts and this same voltage was obtained at only 0.04 asi towards the end of conversion. In addition, a small amount of the acid in the center compartment had leaked to the anode compartment. The cathode compartment contained only 0.1N (0.4%) sodium hydroxide.

A later patent to Wallman (U.S. Pat. No. 3,411,998) teaches using a cell such as described by Bodamer for reclaiming spent alkali metal carboxylate solutions. In this patent, the total reaction for the center compartment when a tribasic acid such as citric acid (Cit) is used is:

$$Na_3Cit + 2H^+ \rightarrow NaH_2Cit + 2Na^+$$

The total process involves feeding the caustic formed at the cathode to an evaporator for concentration to a useful level. The membranes used in the process were typical hydrocarbon types available commercially at that time.

A later patent to Giuffrida (U.S. Pat. No. 4,057,483) attempts to improve the process of the above-mentioned three-compartment cell by adding another compartment. In this patent, a four-compartment cell is formed by interposing three cation exchange membranes between the anode and cathode. The membranes used are said to be selected from those commercially available. In this cell, the sodium salt of the weak acid is circulated through both center compartments with predominant conversion of the salt to the acid being achieved in the compartment nearest the anode. The purpose of the extra compartment is to intercept protons transported from first compartment and thus prevent neutralization of the caustic formed at the cathode with the attendant loss in current efficiency. A further purpose of the four compartment cell is to provide a buffer zone formed by the intermediate salt feed compartment. The prior art three compartment cell at low conversions not only tend to lose weak acid ions to the anolyte but at high conversions allows great loss of weak acid to the catholyte. Examples 1 and 2 of the patent show a direct comparison of the four compartment and the three compartment with 8% caustic in the catholyte. The four compartment gives 83% current efficiency while the three compartments only an average of 65%. No cell voltage information is given in any examples. Thus, overall power efficiencies can not be calculated.

BRIEF DESCRIPTION OF THE INVENTION

The present invention represents an improvement over known electrolytic methods of converting salts of weak acids to their corresponding free acids. The invention uses a three-compartment cell similar to the cell described by Bodamer. The cell is constructed by interposing two cation exchange membranes between an anode and a cathode. The membrane facing the anode may be either a sulfonated hydrocarbon variety or a sulfonic acid fluorocarbon type. A critical feature is that the membrane facing the cathode be of the fluorocarbon variety. The functional group may be sulfonic acid, carboxylic acid, or a combination of both sulfonic and carboxylic. When both are present, the carboxylic should preferably face the cathode. Use of the fluorocarbon membranes facing the cathode, and thus in contact with the caustic solution in the cathode compartment leads to far higher current efficiencies than described in the prior art. In fact, higher current efficiencies are achieved than those reported by Giuffrida using the four-compartment type cell. The present invention accomplishes this without having to pay the power (voltage) penalties associated with the extra membrane and the extra compartment of the four-compartment cell. In addition, when the fluorocarbon membrane is used at the cathode far higher strength caustic can be produced in the cathode compartment than previously reported. The higher strength caustic is achieved while still maintaining current efficiencies superior to the prior art. Thus, in a process where caustic strength is critical for further use of the caustic, either no evaporator as the prior art describes or extremely reduced evaporator load is achieved by the present invention. When greater than about 20% caustic is desired, it is preferable to use a fluorocarbon carboxylic functional membrane facing the cathode. It being understood the membrane side facing the center compartment may be sulfonic or carboxylic. It is advantageous, particularly when sulfonic acid functional membranes are used, to serially flow catholyte portion to catholyte portion in a series of cells in a continuous process. By doing so, a current efficiency average is attained which is higher than the current efficiency resulting if all cells were operated at the highest or resultant caustic strength.

A further embodiment of the present invention is a means for achieving higher conversion of the salt of the weak acid to acid without significant transference of the said acid into adjoining compartments without paying the power penalties described in the prior art. During the course of converting the sodium salt of the weak acid to the free acid, the center compartment, where this conversion takes place, becomes a progressively weaker electrolyte and thus less electrically conductive. Particularly towards the end of the conversion, this phenomenum causes either a large increase in cell voltage when a constant current is applied or a large decrease in current when a constant voltage is applied. In either case, the power consumption of the process must substantially increase towards the later stages of conversion or the productivity of the cell must be curtailed dramatically. It is desirable to maintain a constant current and thus constant productivity from the process and thus an increase in power consumption would be the normal penalty. In a batch process, this penalty is not nearly as severe as in a continuous process utilizing the same number of cells. The batch process, in essence, averages the power consumption over the entire conversion. Only a fraction of the run is under conditions where the higher power consumption is in effect. However, it may be desirable to operate the process continuously. In this case, the weak acid salt solution would normally be flowed to the cells at a rate such that the total desired conversion would be accomplished in one pass. In this mode, the cells would always be at a point of high conversion, since the outflow represents the final product, and thus is in the region of high power consumption.

Surprisingly, it has been found that the voltage of the cells stays relatively constant through about 70-90% of the conversion of the acid salt to the acid without significant transference of said acid into adjoining compartments. Thus, 70-90% of the conversion can be accomplished without significant voltage or power penalties or product loss in a continuous process or batch. It is then possible to pass the outflow from the first cells to a second finishing cell or set of cells and in this way only take the power penalty on from about 10 to 30% of the cells employed in the process. All of this can be accomplished while still maintaining the continuous mode of operation. The power penalty can be further reduced by operating the second cell or set of cells at reduced current density. The main feature of this embodiment of the invention is that the first 70-90% of the conversion is a continuous process which is accomplished in a separate electrolysis process and the remainder accomplished in a finishing electrolysis process. It would, of course, be beneficial, relative to a normal continuous process, to take only 50% or even lower conversion in a separate step, but for maximum benefit, the finishing cell or cells should be kept as small as possible. In general, this will be determined by the point in conversion at which a sizeable increase in power consumption occurs. For example, if the power increase occurred at 75% conversion, then 25% of the cells, assuming equal current density throughout, would be used as finishing cells and thus only 25% of the power penalty that would have been associated with running all cells equally would actually be realized. It is possible, and in many cases desirable, to have more than one set of finishing cells. The flow can beneficially be cascaded through any number of finishing cells although a point of diminishing returns is reached at or about ten cells or sets of cells.

In accordance with a preferred embodiment of the present invention an electrolytic process for converting salts of organic acids to corresponding free acids is improved by employing a cationic permselective fluorocarbon membrane. The employment of such membranes to separate the conventional three compartments of such processes, i.e. the anolyte compartment, the catholyte compartment and the intermediate compartment wherein the conversion occurs, results in a more energy efficient process, a higher concentration of base in the catholyte and fewer byproduct contaminants within the respective compartments is occasioned. In addition, where a continuous process is desired, the employment of a major conversion cell or cells in series with one or more finishing cells reduces the overall power requirements and improves the overall current efficiencies of the process.

Any of the several prior art cell designs may be employed but the three compartment cell is the preferred model. The cells of the present invention are preferably designed to have a very narrow intermediate cell, measured membrane to membrane, preferably about 0.7 to 1.0 millimeter and most preferably less than 0.7 mm. The intermediate cell is placed under a positive pressure from each of the anolyte and catholyte chambers. The membranes are maintained spaced apart by a non-reactive, non-conductive porous separator, preferably a woven or non-woven laminar mesh like scrim as for example polyethylene or polypropylene. The thickness of such a scrim determines the minimum spacing between the pairs of membranes.

The electrodes are not critical in materials of construction nor in design and may be any of the known reported prior art materials suitably taught to be stable and useful for each of the anolyte and catholyte electrolytes. For example platinum on a titanium support as well as lead, tin, silver, antimony, iridium, ruthenium, cobalt or mixtures thereof as well as coatings on a support such as titanium, carbon, steel, etc. may be employed as the anode material. Cathode prepared from palladium, platinum, nickel, carbon, steel, titanium or mixtures thereof which may be employed as is or as a coating on a support such as carbon, steel or titanium.

Membranes suitable for use in accordance with the present invention are the sulfonic and/or carboxylic acid functionalized polymer membranes such as sulfonic acid form of styrene divinyl benzene or fluorocarbon polymer membranes. It is a preferred embodiment of the present invention that the membrane facing the cathode is the fluorocarbon variety.

The nature of the acid product produced by the present invention is any water soluble acid of which its salt, e.g. alkali metal or ammonium salt is also soluble to some extent in water.

Similarly the number of cells to make up a unit is not critical but should be of a number and size to accomodate the available power supply.

Preferably the process should be designed to produce 70-90% conversion of the salt to the acid in one unit of cells and employ either a separate unit or certain selected cells in the first unit to carry out the more power intensive, less current efficient finishing of the remaining 10 to 30% of the salt to the acid.

Preferably the finishing cells are operated in cascade fashion and the principal conversion cells in once through fashion being operated in parallel flow.

When feasible, it is preferable to operate the process in a batch mode utilizing a recycle tank and forced circulation to obtain the desired conversion of acid salt to acid. In this instance no separate finishing cells, tanks, pumps, or power supply are required to obtain the desired product.

The present invention is idealized in illustration in the drawings.

DETAILED DESCRIPTION OF THE INVENTION

Figure 1:
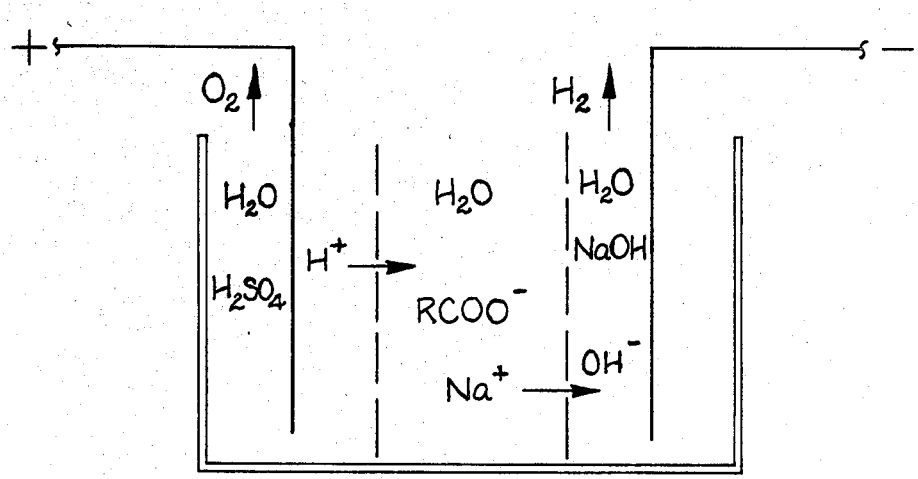
FIG. 1 illustrates in side view an idealized cell.
Figure 2:
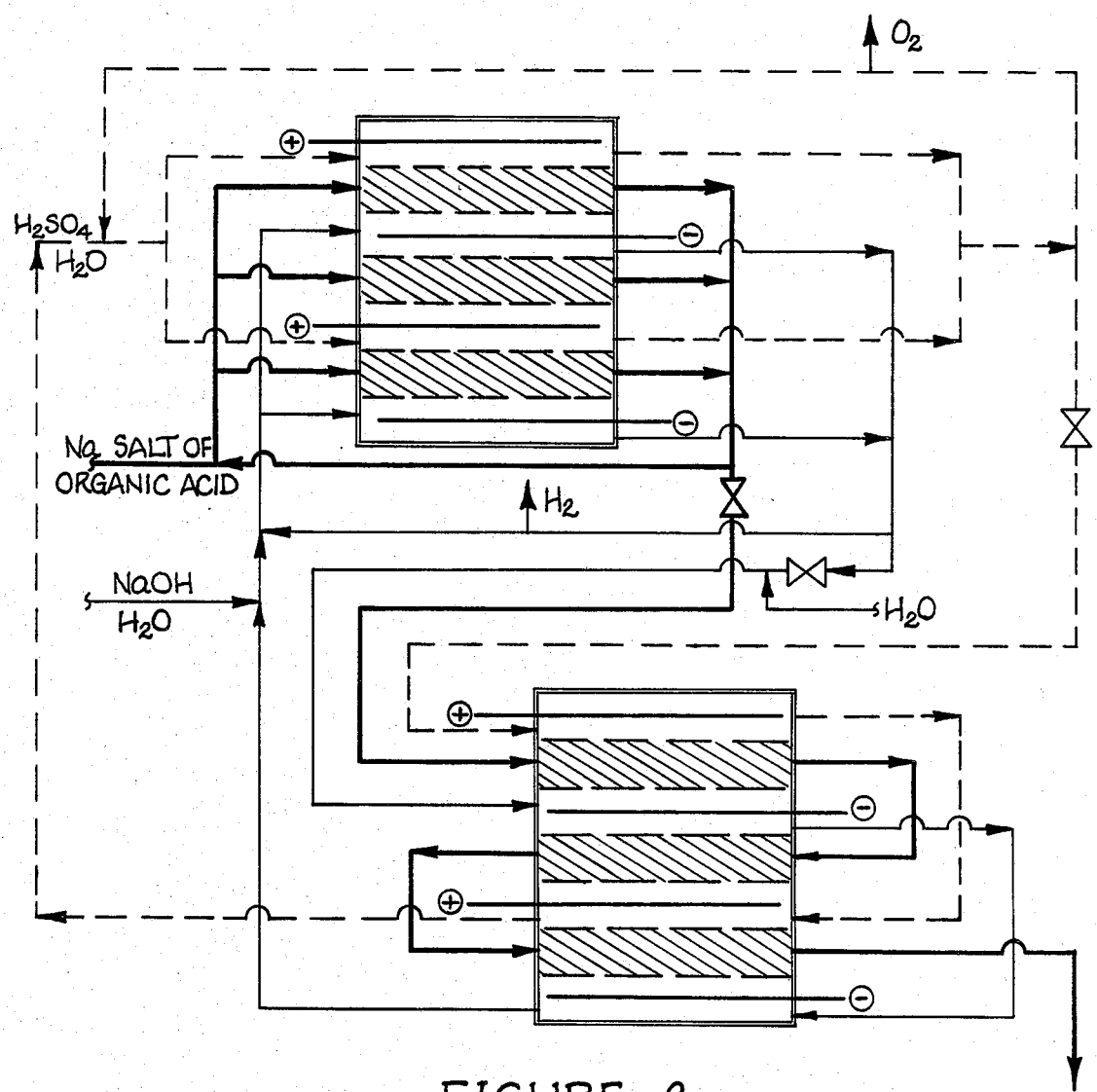
FIG. 2 illustrates typical principal conversion cells in parallel and cascading finishing cells.
Figure 3:
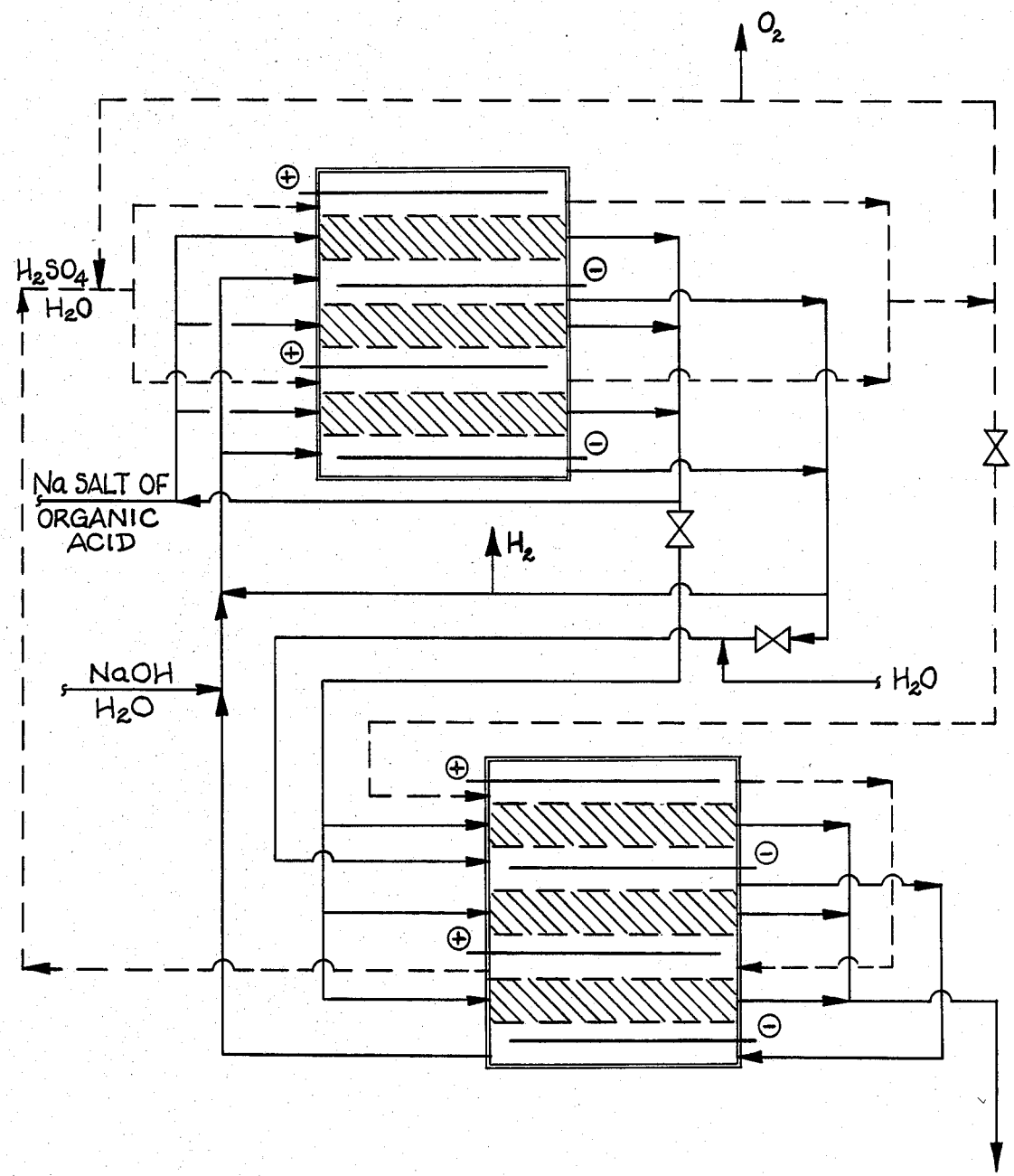
FIG. 3 illustrates principal conversion cells and finishing cells operative in parallel flow for product and the catholyte and anolyte cascade in flow in the finishing cells.

In the following examples the nature of the membrane composition is shown to be important in the economics of operation of the conversion of an acid salt to its free acid. The cell employed is that exemplified in FIG. 1 and uses nine square inch electrodes.

Cell Description: For both cases A and I
anode—Ir on titanium mesh
cathode—nickel coated woven steel wire
membranes
  Case A—two Ionics 61-CZL-386 styrene divinyl benzene cation exchange membranes.
  Case I—One Nafion 324 fluorocarbon cation exchange membrane and one Nafion 901 fluorocarbon carboxylic acid, sulfonic acid functionalized bilayer cation exchange membrane.
cell body—plexiglass, 3-compartment, active electrode area=9 in$^2$, current density=0.5 amp/in$^2$.

CASE A COMPARATIVE EXAMPLE PROCESS DESCRIPTION

The anolyte is comprised of 2,000 cc of 2 wt% $H_2SO_4$ and is pumped through the anode chamber at 744 cc/min. The catholyte is comprised of 24 wt% NaOH and is pumped through the cathode chamber at 734 cc/min. The middle solution is comprised of 870 grams of 35 wt% N-(hydroxyethyl)ethylenediamine triacetic acid sodium salt ($Na_3HEDTA$) in $H_2O$. Its flow rate through the middle compartment is 81 cc/min. The voltage of the cell is adjusted to yield a current density of 0.5 amp/in$^2$. During a run time of 4 hrs at a cell potential of 4 volts there was no decrease in the pH of the middle solution detected and the run was terminated.

CASE I PROCESS DESCRIPTION FOR PRESENT INVENTION

The anolyte is comprised of 2,000 cc of 2 wt% $H_2SO_4$ and was pumped through the anode chamber at 820 cc/min. The catholyte was comprised of 24 wt% NaOH and was pumped through the cathode chamber at 680 cc/min. The middle solution was comprised of 834 grams of 35 wt% $Na_3HEDTA$ in $H_2O$. The flow rate through the middle compartment was 104 cc/min. The voltage of the cell was adjusted to yield a current density of 0.5 amp/in. During a run time of 4 hrs, the pH of the middle solution dropped from a pH 13 to pH 11.1. After 30 hrs, the pH of the middle solution was pH 2.5. An increase in the cell voltage occured as the sodium ion decreased in concentration.

Cell Description: For both cases II and III
anode—Pt, Ir on titanium mesh
cathode—steel punched plate
membranes
  Case III—two MC3470 Ionacs styrene divinylbenzene based cation exchange membranes.
  Case IV—Two Nafion 324 fluorocarbon based cation exchange membranes.
cell body—CPVC 3-compartment, active electrode area=9 in$^2$, current density=1.25 amps/in$^2$.

CASE II DESCRIPTION

The anolyte was comprised of 2,000 cc of 5 wt% $H_2SO_4$ and was pumped through the anode chamber at 400 cc/min. The catholyte was comprised of 19 wt% NaOH and was pumped through the cathode chamber at 400 cc/min. The middle solution was comprised of 7,154 grams of 35 wt% HEDTA sodium salt in water. The flow rate through the middle compartment was 370 cc/min. The voltage of the cell was adjusted to yield a current density of 1.25 amps/in$^2$.

CASE III DESCRIPTION

The anolyte was comprised of 2,000 cc of 5 wt% $H_2SO_4$ and was pumped through the anode chamber at 500 cc/min. The catholyte was comprised of 20 wt% NaOH and was pumped through the cathode chamber at 400 cc/min. The middle solution was comprised of 3,800 grams of 35 wt% $Na_3HEDTA$ in water. The flow rate through the middle compartment was 360 cc/min. The voltage of the cell was adjusted to yield a current density of 1.25 amps/in$^2$.

The examples given are divided into two caustic concentrations. Cases A and I were operated to produce 24 wt% NaOH. As obvious from Table I Case A gave no conversion of N-(hydroxyethyl)ethylenediamine triacetic acid trisodium salt ($Na_3HEDTA$) to N-(hydroxyethyl)ethylenediamine triacetic acid (HEDTA). Case I functioned well and yielded an overall current efficiency of 59.6% for the conversion of $Na_3$ HEDTA to HEDTA. Cases II and III were operated to yield a caustic concentration of 20 wt%. Cases II and III gave overall current efficiencies of 53.15% and 74.9% respectively. Even though sulfonic acid functionalized styrene divinylbenzene based membranes may be utilized (as apparent by Case II) it is readily seen that when 20 wt% or greater caustic is desired, it is preferable to use a membrane of the fluorocarbon variety.

TABLE I

|   | A Comparative | I | II | III |
|---|---|---|---|---|
| Anode Material | | Ir on Ti | | Pt/Ti mesh |
| Cathode Material | | Ni coated woven wire | | punched steel |
| Membranes | Ionics 61CZL | Nafion ® 324 (anode | Ionacs MC3470 | Nafion 344 |
| Current Density/ Cell potential | 0.5 ASI*/4-5 | 0.5 ASI/in$^2$/ 6.5-6 | 1.25 ASI 8.1-7.5 | 1.25 ASI 7.5-5.5 |
| Anolyte | 2% $H_2SO_4$ 844 cc/min. | Same 820 cc/min | 5% $H_2SO_4$ 400 cc/min | 15% $H_2SO_4$ 500 cc/min |
| Catholyte | 24% NaOH | Same | 19% NaOH | 20% NaOH |

TABLE I-continued

| | A<br>Comparative | I | II | III |
|---|---|---|---|---|
| Anode Material | | Ir on Ti | | Pt/Ti mesh |
| Cathode Material | | Ni coated woven wire | | punched steel |
| Intermediate | 734 cc/min<br>35% N-(hydroxyethyl)-<br>ethylene diamine<br>triacetic acid,<br>Na salt | 680 cc/min | 400 cc/min<br>Same | 400 cc/min<br>Same |
| pH decrease | 81 cc/min<br>4.0 hours<br>No Decrease | 104 cc/min<br>4 hrs. 13 to 11.1<br>30 hrs. 2-5 | 370 cc/min<br>13-2.5<br>140 hrs. | 360 cc/min<br>13-2.5<br>50 hrs. |
| Current Eff. | — | 59.6 | 53.15 | 74.9 |

*ASI = Amps/in$^2$

We claim:

1. In a process for converting the salt form of an organic acid to its corresponding free acid form in an electrolytic cell system utilizing permselective cation membranes to establish an anode compartment, a cathode compartment and an intermediate compartment wherein the conversion occurs and wherein the anode compartment contains an acidic aqueous electrolyte, the cathode compartment contains a basic aqueous electrolyte, and the intermediate compartment contains an aqueous solution of the ionized salt of the acid and the free acid, the improvement which consists essentially of the use of a fluorocarbon membrane facing the cathode and employing a maximum spacing between membranes forming the central compartment of 1 millimeter or less.

2. In the process of claim 1 wherein a fluorocarbon membrane faces the anode and the organic acid salt is a salt of an amino acid.

3. In the process of claim 1 wherein a hydrocarbon membrane faces the anode and the organic acid salt is a salt of an amino acid.

4. In the process of claim 2 wherein the membrane facing the cathode has sulfonic acid groups.

5. In the process of claim 2 wherein the membrane facing the cathode has polycarboxylic groups or carboxylic groups facing the cathode and sulfonic acid groups facing the center compartment.

6. In the process of claim 1 wherein the conversion of salt in the center compartment is from 70 to about 90%.

7. In the process of claim 6 wherein conversion of salt to greater than 70-90% is completed in a separate cell or cells.

8. In the process of claim 2 wherein the center compartment has a thickness of 1 mm or less.

9. In the process of claim 1 wherein the concentration of alkali metal hydroxide in the catholyte compartment is greater than 10%.

10. In the process of claim 2 wherein the alkali metal hydroxide is sodium hydroxide.

* * * * *